No. 710,660. Patented Oct. 7, 1902.
T. G. BENNETT & T. C. JOHNSON.
SEMI-AUTOMATIC GUN.
(Application filed Nov. 29, 1901.)
(No Model.) 3 Sheets—Sheet 1.
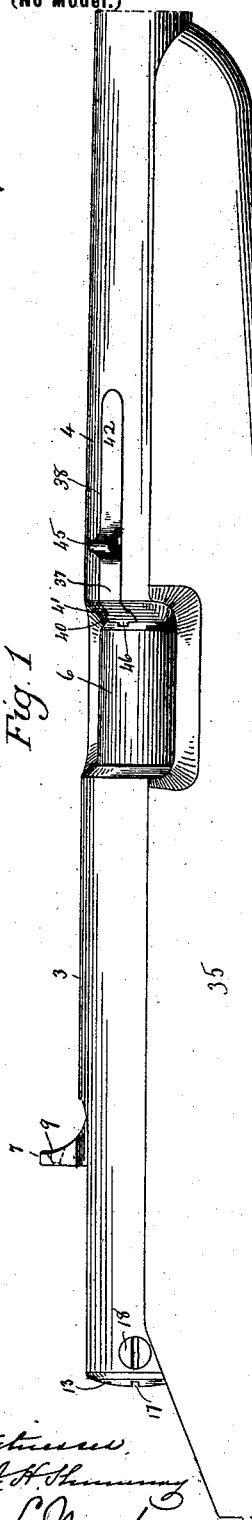
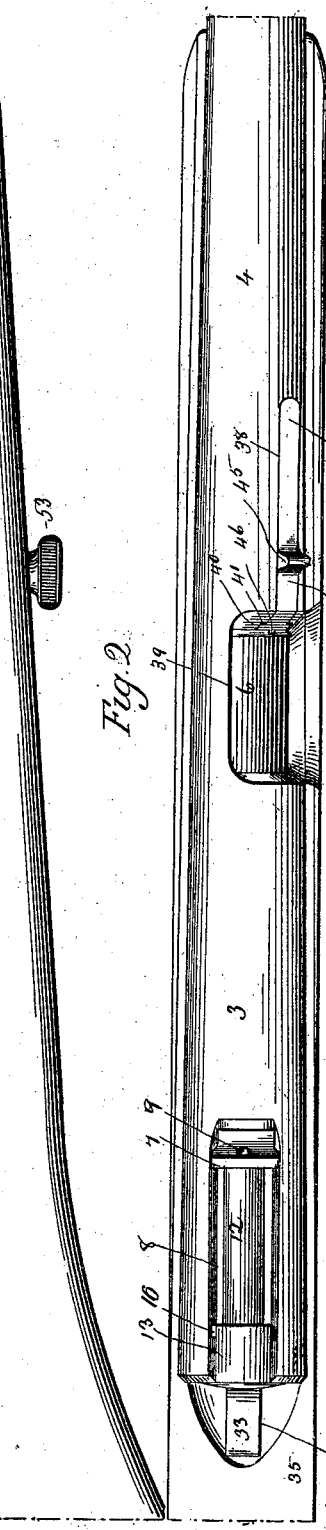
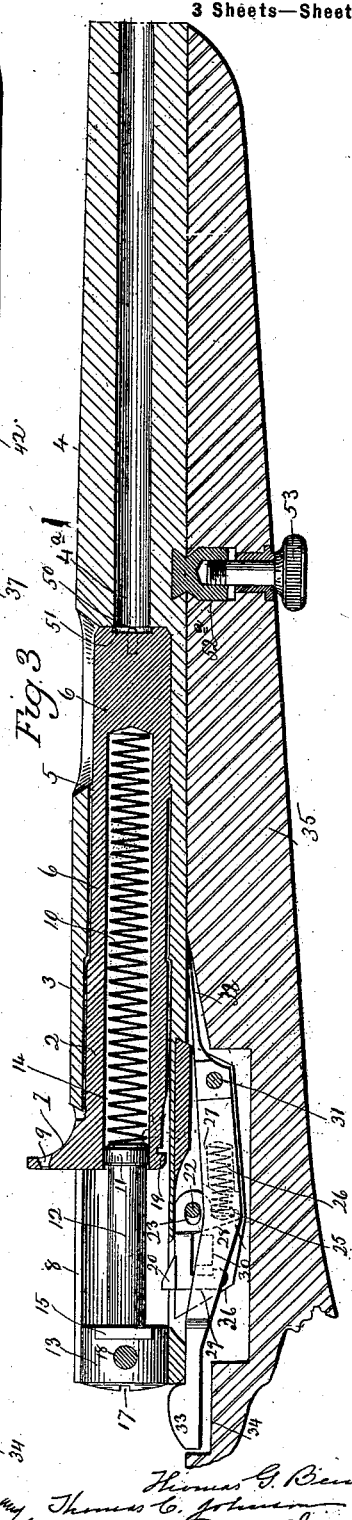

No. 710,660. Patented Oct. 7, 1902.
T. G. BENNETT & T. C. JOHNSON.
SEMI-AUTOMATIC GUN.
(Application filed Nov. 29, 1901.)
(No Model.) 3 Sheets—Sheet 2.
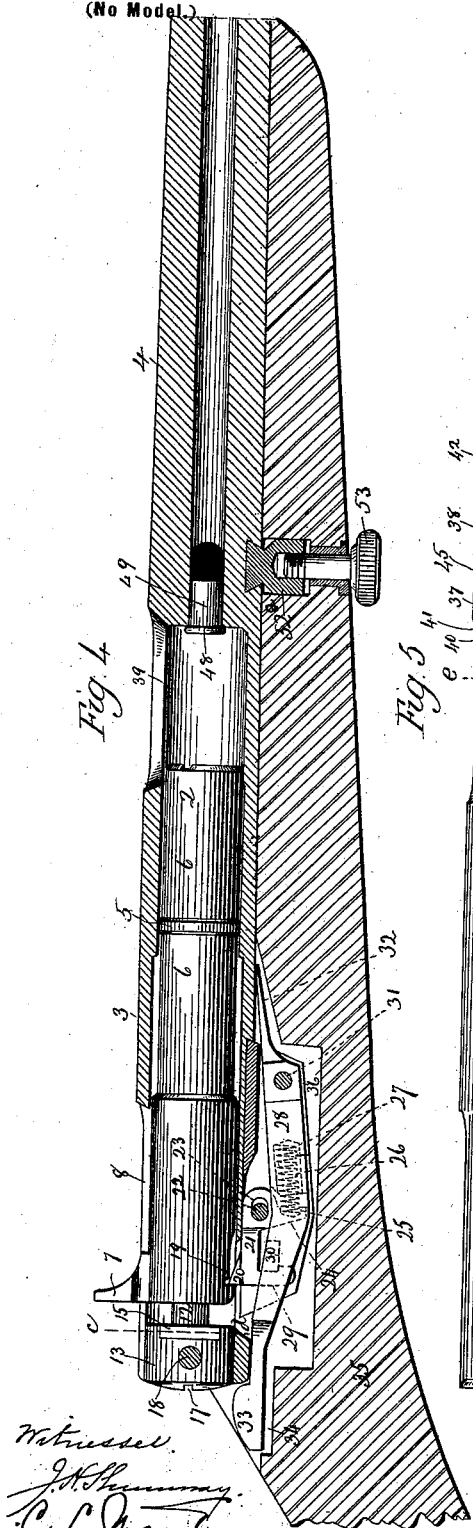
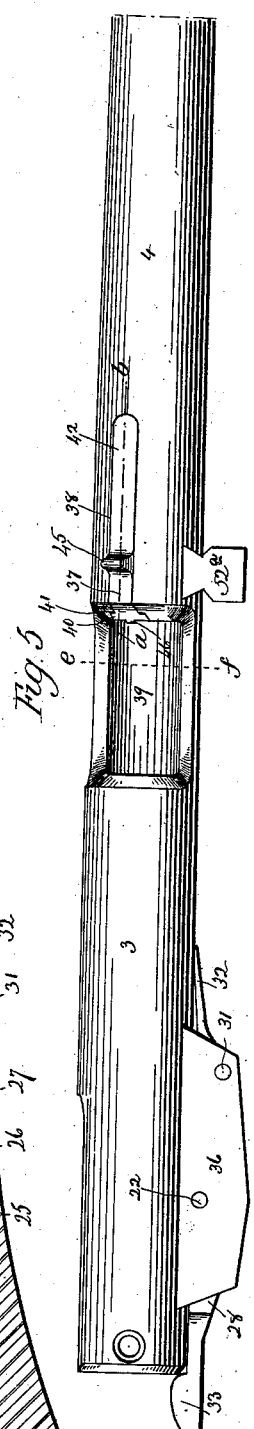
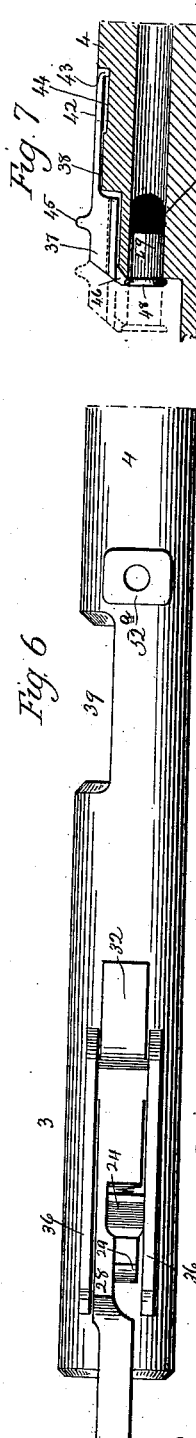
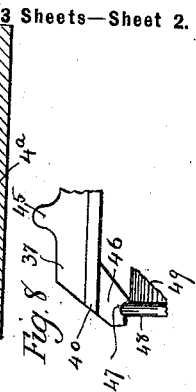
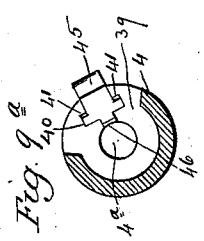
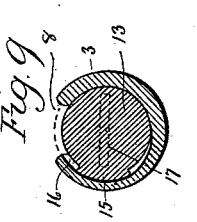

No. 710,660. Patented Oct. 7, 1902.
T. G. BENNETT & T. C. JOHNSON.
SEMI-AUTOMATIC GUN.
(Application filed Nov. 29, 1901.)
(No Model.) 3 Sheets—Sheet 3.
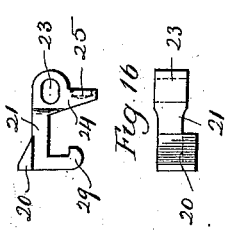
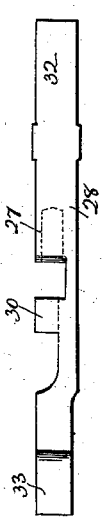
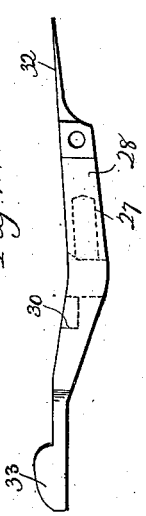

UNITED STATES PATENT OFFICE.

THOMAS G. BENNETT AND THOMAS C. JOHNSON, OF NEW HAVEN, CONNECTICUT, ASSIGNORS TO WINCHESTER REPEATING ARMS CO., OF NEW HAVEN, CONNECTICUT, A CORPORATION.

SEMI-AUTOMATIC GUN.

SPECIFICATION forming part of Letters Patent No. 710,660, dated October 7, 1902.

Application filed November 29, 1901. Serial No. 83,978. (No model.)

*To all whom it may concern:*

Be it known that we, THOMAS G. BENNETT and THOMAS C. JOHNSON, of New Haven, in the county of New Haven and State of Connecticut, have invented a new and useful Improvement in Semi-Automatic Guns; and we do hereby declare the following, when taken in connection with the accompanying drawings and the numerals of reference marked thereon, to be a full, clear, and exact description of the same, and which said drawings constitute part of this specification, and represent, in—

Figure 1, a broken view, in side elevation, of a semi-automatic gun constructed in accordance with our invention; Fig. 2, a broken plan view thereof; Fig. 3, a broken view of the gun, partly in elevation and partly in vertical longitudinal section, the parts being shown in their closed positions; Fig. 4, a corresponding view showing the gun loaded and ready to fire; Fig. 5, a detached broken view, in side elevation, of the barrel and barrel extension as they appear when removed from the stock; Fig. 6, a detached broken reverse plan view of the barrel and barrel extension; Fig. 7, a broken sectional view of the barrel on the line $ab$ of Fig. 5, showing the combined cartridge-extractor and cartridge-retainer in its cartridge-retaining position in full lines and in its cartridge-extracting position by broken lines; Fig. 8, an enlarged broken detail view showing the engagement of the rear end of the said combined part with the head of a cartridge; Fig. 9, a view in vertical transverse section on the line $cd$ of Fig. 4 looking rearward and showing segmental locking-lug formed on the plug for securing the same in the rear end of the barrel extension; Fig. 9$^a$, a view in vertical transverse section on the line $ef$ of Fig. 5 and showing the provision made for the lateral movement of the combined extractor and retainer; Fig. 10, a detached perspective view of the breech-bolt; Fig. 10$^a$, a view thereof in front elevation, showing the position of its fixed firing-pin; Fig. 11, a corresponding view of the breech-bolt guide; Fig. 12, a detached view, in side elevation, of the firing-spring; Fig. 13, a detached plan view of the thumb-trigger; Fig.
14, a corresponding view thereof in side elevation; Fig. 15, a detached view, in side elevation, of the longitudinally-movable sear; Fig. 16, a plan view thereof.

Our invention relates to that class of guns in which the recoil following the explosion of the cartridge is utilized for recocking the gun and extracting and ejecting the spent shell, and which are therefore called "semi-automatic" guns to distinguish them from guns in which the recoil is utilized not only for recocking, but also for reloading, the object being to produce a simple, compact, reliable, and safe single-loading semi-automatic gun constructed with particular reference to fewness of parts, durability, convenience, and non-liability to derangement.

With these ends in view our invention consists in a single-loading semi-automatic gun having certain details of construction and combinations of parts, as will be hereinafter described, and pointed out in the claims.

In carrying out our invention as herein shown we employ a tubular breech-bolt 2, which belongs to that class of breech-closures which are not positively locked for the purpose of taking the shock of recoil, but which are made to contain a quantity of metal proportioned to the weight of the bullet and the strength of the propelling charge, so that the shock of recoil will be absorbed by the aggregate mass of the breech-closure, which in a sense therefore balances the recoil. For this reason the breech-bolt 2, now to be described, will be spoken of as a "balanced breech-bolt" to distinguish it from positively-locked breech-closures. This breech-bolt reciprocates back and forth in a tubular barrel extension 3, formed integral with a barrel 4. Near its forward end the bolt 2 is provided with an annular bearing-rib 5, which rides upon the inner periphery of the barrel extension 3 and reduces the friction of the operation of the bolt, the forward portion of which is reduced in diameter on opposite sides of the said rib, as at 6 6, for the formation thereof. At its rear end the bolt is provided with an upwardly-projecting finger-piece or handle 7, which provides for the manual retraction of the bolt, guides the same as it moves back and forth, and constitutes the rear sight of the gun. This finger-piece moves back and forth in a slot 8, formed in the upper wall of the rear end of the barrel extension, and the engagement of its edges with the side walls of the said slot guides the bolt and prevents it from turning. To adapt the finger-piece 7 to be used as a rear sight for the gun, it is formed with a peep-sight opening 9. This is an advantageous construction, because it locates the rear sight of the gun at a maximum distance from the front sight thereof and avoids the use of a special rear sight.

A coiled spring 10, located within the bolt 2, throws the same into its closed position and constitutes the firing-spring of the gun, for which reason we shall for convenience speak of it as the "firing-spring." The forward end of this spring impinges against the closed forward end of the bolt, while its rear end impinges against a guiding-head 11, located at the forward end of a heavy stud 12, the rear end of which terminates in a plug 13, adapted in diameter to fit snugly within the open rear end of the barrel extension 3. The said head, stud, and plug are formed integral with each other and together form a guide for the breech-bolt. The periphery of the head 11 engages with the inner periphery of the chamber 14 of the bolt, whereby the rear end of the same is guided as the same reciprocates back and forth. In this way the guiding-head 11 does for the rear end of the bolt what the annular bearing-rib 5 does for the forward end thereof. For holding the plug 13 in place it is formed upon its forward edge with a segmental locking-lug 15, entering a transversely-arranged locking-groove 16, formed in the barrel extension and leading inward from the right-hand wall of the slot 8, formed in the barrel extension, as aforesaid. The said plug is entered into the rear end of the said slot with its locking-lug 15 in line therewith and is moved forward therein until the lug is brought into registration with the locking-groove 16, after which the plug is turned for a quarter-turn from left to right by entering a screw-driver or equivalent instrument into a slot 17, formed in its crowning outer face. A heavy retaining-screw 18 is then passed through the side walls of the barrel extension and through the plug, which is now doubly secured in place by the locking-lug and by the screw, the latter having the additional function of drawing the side walls of the barrel extension together and stiffening the same.

A cocking-notch 19, formed in the lower face of the rear end of the breech-bolt 2, receives the nose 20 of the sear 21, which is hung upon a pivot 22, passing through a horizontally-elongated pivot-hole 23, formed in its forward end. On account of the described elongation of the pivot-hole 23 the sear 21 is permitted to have a longitudinal movement in addition to a swinging movement. The object of this will be described later on. The said sear 21 is provided with a depending arm 24, the forward face of which contains a shallow recess 25, receiving the rear end of a spiral sear-spring 26, the forward end of which is entered into a deep hole 27, formed in the body of the thumb-trigger 28. The said sear is formed at its rear end with a depending forwardly-turned sear-hook 29, which coacts with a coupling-lug 30, extending horizontally inward from the said thumb-trigger 28 and located just to the rear of the longitudinal center thereof.

The thumb-trigger 28, before referred to, is hung upon a pivot 31 and provided at its forward end with an integral flat spring 32, which constitutes the trigger-spring, and at its rear end with a thumb-piece 33, which projects rearward beyond the barrel extension 3 in position to be conveniently operated by the user of the arm. The said thumb-piece 33 is located in a recess 34, formed in a gun-stock 35, the recess 34 being so deep that the upper edge of the thumb-piece is located below the surface of the stock, and therefore in such a retired position that the necessity of having any guard for the trigger is dispensed with. In other words, the thumb-piece falls below the general contour of the stock. The said sear 21 and the trigger 28 are located in a housing consisting of two corresponding parallel flanges 36, formed integral with or secured to the lower face of the rear end of the barrel extension and sufficiently separated from each other to receive the sear and trigger between them. The pivot 22 of the sear and the pivot 31 of the trigger are supported at their ends in these flanges, as shown in Fig. 5.

A longitudinally-movable combined cartridge-extractor and cartridge-retainer 37 is located in a recess 38, formed in the gun-barrel 4 and extending forward from the forward wall of a feeding and ejecting opening 39, formed in the right-hand side of the forward end of the barrel extension 3. At its rear or body end this combined part is formed with two oppositely-projecting guide-ribs 40 40, which extend into corresponding but wider guide-grooves 41 41, leading out of the side walls of the recess 38. As the grooves 41 are wider than the ribs 40, the combined part is allowed a slight amount of lateral play under the control of its spring 42, which consists of a comparatively thin flat extension of its forward end. The said spring 42 is formed at its extreme forward end with an inwardly-turned stop-lug 43, which limits the longitudinal movement of the combined part by its engagement with the end walls of a recess 44, leading out of the bottom of the forward end of the recess 38. A lug 45, formed upon the outer face of the combined part, provides for the manual operation of the same in removing a loaded cartridge from the cartridge-chamber $4^a$ of the gun-barrel. The extreme rear end of the said combined part is formed with an inwardly-extending nose 46, containing a notch 47, adapted to receive a rim 48 of a cartridge 49.

When a cartridge is loaded into the gun through the loading and ejecting opening 39, it is pushed forward into the cartridge-chamber 4ª until its rim 48 strikes the nose 46 of the combined cartridge-retainer and cartridge-extractor, the rear end of which is then pushed outward within the limits of the grooves 41 41 against the tension of its spring 42, permitting the rim of the cartridge to enter the notch 47 aforesaid. The cartridge is now held in the cartridge-chamber by the tension of the spring 42 of the combined part and will not fall out of the said chamber 4ª in any position in which the gun may be placed.

When the gun is fired, the spent shell is blown rearward out of the cartridge-chamber 4ª and follows the recoiling excursion of the balanced breech-bolt 2 and is then ejected from the gun through the opening 39, as will be described later on.

When it is desired to use the combined part as a cartridge-extractor, it is operated by its lug 45 and shoved rearward partly out of its recess 38. As it is shoved rearwardly its nose 46 pushes against the rim of the cartridge and extracts the cartridge, which is not only pushed rearwardly, but moved inwardly by its spring 42 within the limits of the grooves 41 41 aforesaid.

A firing-pin 50 is fixed in the forward end of the breech-bolt 2 near one edge of a shallow circular recess 51, formed in the forward end thereof for the clearance of the heads of the cartridges. A slot 52, leading out of the said recess 51, is provided for the clearance of the nose 46 of the combined cartridge-extractor and cartridge-retainer. The firing-pin 50 has no movement independent of the breech-bolt, with which it may be formed integral, if desired.

The gun being described is a take-down gun, its barrel, barrel extension, and all of the parts associated therewith being secured to the stock through the medium of a take-down block 52ª, secured to the lower face of the barrel and threaded for the reception of a take-down screw 53, mounted in the fore-stock.

Having now described the construction of our improved gun, we will proceed to describe the operation thereof. In the first place the bolt 2 is drawn back manually by means of its finger-piece 7 and against the tension of the firing-spring 10 until the nose 20 of the sear 21 snaps into the cocking-notch 19. Rearward draft upon the bolt now being relieved, it moves forward for a short distance, which is represented by the length of the elongated pivot-hole 23 of the sear in excess of the diameter of the pivot 22 thereof. During this short forward movement of the bolt the sear is correspondingly moved forward and its spring 26 compressed, this spring being of course very much weaker than the firing-spring 10. As the sear 21 is moved longitudinally forward its hook 29 passes under the lug 30 of the thumb-trigger, completing the cocking of the gun. A single cartridge is now manually loaded into the gun through the opening 39 thereof and pushed forward into the cartridge-chamber 4ª. Just before the cartridge reaches its home position sufficient pressure must be applied to it to force its flange 48 into the notch 47 of the combined cartridge-retainer and cartridge-extractor, the rear or body end of which will be pushed slightly outward at this time against the tension of its spring 42, whereby the cartridge is retained in the cartridge-chamber 4ª by the combined part, so that it will not drop out in any position in which the gun may be placed. The gun is now sighted through the peep-sight opening 9 in the finger-piece 7 of the bolt and the thumb-trigger depressed by the application of the thumb to the thumb-piece 33 of the trigger. Now as at this time the hook 29 of the sear is hooked under the coupling-lug 30 of the thumb-trigger the depression of the thumb-trigger will cause the sear to be swung downward and its nose 20 disengaged from the cocking-notch 19 of the bolt, which will now leap forward under the action of the firing-spring 10. Just before the bolt reaches its closed position the firing-pin 50 will strike the rim of the cartridge, which will be exploded in the cartridge-chamber 4ª. As the breech-bolt is not positively locked, the recoil following the explosion of the cartridge will blow the spent shell out of the gun-chamber and force the breech-bolt rearward to the limit of its rearward excursion, and as the mass of the bolt is proportioned to the weight and velocity of the bullet the force of recoil will be absorbed by the breech-bolt, which will, so to speak, "balance" the force of recoil so nearly that the bolt is stopped at the limit of its rearward excursion without undue shock. When the breech-bolt reaches the limit of its rearward excursion, the sear-spring 26 lifts the nose 20 of the sear 21 into the cocking-notch 19 of the bolt, so that the bolt will be caught and held against the tension of the firing-spring 10 at the limit of its rearward excursion, even though the user of the arm has not relieved that pressure on the trigger which has just caused the firing of the gun. If this were not so, the automatic cocking of the gun would not be effected, as the rearward excursion of the bolt is completed before the user of the gun has time to relieve the downward pressure of his thumb upon the thumb-piece of the trigger. In order to fire the gun again, the user of it must let up on the trigger, so as to allow its spring 32 to lift it, and therefore raise its coupling-lug 30 sufficiently to allow the hook 29 of the sear to pass under the said lug, after which the firing-spring 10 immediately moves the bolt and sear forward a distance represented by the elongation of the pivot-hole 23 of the sear in excess of the diameter of the pivot 22 thereof. This distance is sufficient to permit the hook 29 of the sear to fully engage the coupling-lug 30 of the trigger, as clearly shown in Fig. 4 of the drawings. It may be here explained that where the nose 20 of the sear rises into the cocking-notch 19 of the bolt in the first place, the trigger being still depressed, the forward edge of the hook 29 of the sear engages with the rear edge of the coupling-lug 30, but cannot get under the same in order to effect the coupling between the trigger and the sear necessary to the operation of the latter in firing the gun.

We have already mentioned that the spent shell is blown rearward with the bolt, which it follows and with which it starts forward when the bolt begins its described short forward movement. During this quick but short forward movement of the bolt the spent shell is given sufficient impetus for its ejection through the loading and ejecting opening 39 of the gun.

It is apparent that in carrying out our invention some changes in the construction herein shown and described may be made. We would therefore have it understood that we do not confine ourselves to this precise construction, but hold ourselves at liberty to make such slight changes and alterations as fairly fall within the spirit and scope of our invention.

Having fully described our invention, what we claim as new, and desire to secure by Letters Patent, is—

1. In a gun, the combination with a tubular breech-bolt, of a firing-spring located within the said bolt which it actuates, and a stud entering the rear end of the bolt, guiding the same and backing up the rear end of the said spring.

2. In a semi-automatic gun, the combination with a barrel having a tubular barrel extension formed in the upper face of its rear end with a slot, of a breech-bolt, a finger-piece or handle extending upwardly from the rear end of the said bolt through the said slot in which it moves back and forth and the said handle also constituting the rear sight of the gun, and means for cocking the bolt at the limit of its rearward excursion into which it is forced by the recoil.

3. In a semi-automatic gun, the combination with a gun-barrel having a tubular barrel extension, of a tubular breech-bolt, a firing-spring located within the said bolt which it actuates, a combined handle and rear sight extending upwardly from the rear end of the said bolt, and a stud entering the rear end of the bolt and secured at its rear end to the rear end of the said tubular barrel extension and constituting a bearing for the said bolt, a backing for the said spring, and an abutment for limiting the recoiling movement of the bolt.

4. In a semi-automatic gun, the combination with a gun-barrel having a tubular barrel extension the rear end of the upper face of which is formed with a slot, of a tubular breech-bolt, a firing-spring located within the said bolt which it actuates, a combined handle and rear sight extending upwardly through the said slot from the rear end of the said bolt, and a stud entering the rear end of the bolt and guiding the same and constituting a backing for the rear end of the spring, and having at its rear end a plug which enters the rear end of the said barrel extension, and constitutes a recoil-abutment for the rear end of the bolt.

5. In a semi-automatic gun, the combination with a gun-barrel having a tubular barrel extension of a tubular breech-bolt located in the said extension, a stud entering the rear end of the said bolt and provided with a guiding-head bearing upon the inner periphery of the bolt and guiding the rear end thereof.

6. In a semi-automatic gun, the combination with a gun-barrel having a barrel extension, of a tubular breech-bolt, a firing-spring located therein, a plug in the rear end of the said extension, a stud carried by the said plug, and a guiding-head located at the forward end of the said stud and impinged against by the rear end of the said spring.

7. In a semi-automatic gun, the combination with a gun-barrel provided with a tubular barrel extension formed at its rear end with a slot, of a tubular breech-bolt, a finger-piece or handle carried by the rear end of the bolt and moving back and forth in the said slot, a firing-spring located within the said bolt, a stud entering the rear end of the bolt, a plug carrying the said stud and provided with a locking-lug entering a groove formed in the said extension and a screw passing through the extension and plug.

8. In a gun, the combination with a gun-barrel, having a barrel extension, of a balanced breech-bolt, a spring for the said bolt, a longitudinally-movable and rocking sear coacting with the bolt to cock it at the limit of its rearward excursion, and a thumb-trigger coacting with the said sear with which it will couple when pressure upon its rear end is removed.

9. In a semi-automatic gun, the combination with a gun-barrel having a tubular extension, of a balanced breech-bolt, a spring therefor, a sear engaging with the bolt and cocking the same at the limit of its rearward excursion, a sear-spring and a thumb-trigger coacting with the sear and provided at its rear end with a thumb-piece, and at its forward end with a spring the said sear-spring throwing the sear out of engagement with the said trigger after the bolt is released.

10. In a semi-automatic gun, the combination with a gun-barrel having a tubular barrel extension, of a breech-bolt located in the said extension and formed in the lower face of its rear end with a cocking-notch, a spring for the said bolt, a longitudinally-movable and rocking sear formed with a nose to enter the said notch, and with a forwardly-turned depending hook, a spring for the said sear, a thumb-trigger provided at its forward end with a spring, at its rear end with a thumb-piece, and between its ends with a coupling-lug coacting with the hook of the sear, whereby the bolt will be invariably cocked by the sear when forced to the limit of its rearward excursion by recoil, even though pressure has not been relieved from the thumb-piece of the trigger.

11. In a gun, the combination with the gun-barrel, of a combined cartridge-retainer and cartridge-extractor comprising a spring, formed at its extreme rear end with an inwardly-extending nose containing a notch shaped to receive the rim of a cartridge, adapted to be manually drawn rearward to perform the function of an extractor, and having tongue-and-groove connection with the said gun-barrel with sufficient play in such connection to permit it to be moved laterally under the control of its spring, whereby the rim of a cartridge is snapped into its said notch, when the cartridge is pushed home into the barrel.

12. In a gun, the combination with a barrel formed at its rear end with a recess, of a combined cartridge-extractor and cartridge-retainer located in the said recess in which it is laterally, as well as longitudinally movable, provided at its extreme rear end with an inwardly-extending nose containing a notch adapted to receive the rim of a cartridge the rim of which is snapped into the said notch when the cartridge is pushed home in the barrel, and the said part having a forwardly-extending spring furnished with a stop-lug entering a recess leading out of the bottom of the said recess formed in the gun-barrel for the reception of the said part.

13. In a semi-automatic gun, the combination with a gun-barrel having a tubular barrel extension containing a feeding and ejection opening from the forward wall of which a recess leads into the said gun-barrel; of a combined cartridge-retainer and cartridge-extractor located in the said recess in which it is manually movable longitudinally for the extraction of spent shells and cartridges and in which it has yielding lateral movement for the engagement of its rear end with the heads of the cartridges when they are pushed home into the gun-barrel, whereby they are prevented from escaping therefrom when the breech-bolt of the gun is open.

In testimony whereof we have signed this specification in the presence of two subscribing witnesses.

THOMAS G. BENNETT.
THOMAS C. JOHNSON.

Witnesses:
DANIEL H. VEADER,
JOSEPH C. LIPPENCOTT.